United States Patent Office
2,933,389
Patented Apr. 19, 1960

2,933,389

SENSITIVITY AGENTS FOR PHOTOTHERMO-
GRAPHIC SUBSTANCES

Peter A. van der Meulen, Highland Park, N.J., and Paul B. Gilman, Jr., Rochester, N.Y., assignors to the United States of America as represented by the Secretary of the Air Force No Drawing. Application November 4, 1957
Serial No. 694,461

4 Claims. (Cl. 96—94)

The present invention relates to photosensitive materials of the type wherein a chemical reaction is initiated upon exposure of the material to suitable light and in which the reaction may be continued by heating in the dark.

Materials of the type above referred to are well known in the art but have not gone into extensive use for photographic purposes since the photosensitivity of these materials is limited almost entirely to the ultraviolet region of the spectrum and does not extend much beyond light with a wavelength of 400 millimicrons. Such emulsions can be used for purposes of printing and reproduction but have no practical value for producing photographic negatives by the use of conventional cameras and exposure to light in the visible region of the spectrum.

Attempts have been made to sensitize mercurous oxalate by sensitizing dyes but these attempts have met but limited success. Emulsions of mercurous oxalate in gelatin, and without sensitizing materials, coated on a glass plate to produce a photographic plate have been exposed in a conventional camera in bright sunlight for more than four minutes. When the same emulsion was sensitized with certain dyes the exposure time was shortened somewhat. However, the necessary length of exposure was measured in minutes and not in fractions in terms of seconds as required under normal photographic conditions.

One object of the present invention is to provide a photothermic mixture which is sensitive to light in the visible region of the spectrum and which can be developed thermally after a relatively short exposure to visible light.

The present invention is based on the discovery that mercurous iodide when mixed with photothermographic substances such as mercurous oxalate and mercurous azide provide mixtures which have much higher photothermal sensitivity in the visible section of the spectrum than do the separate compounds. The increase in spectral sensitivity is probably due to the exceptionally efficient photolytic production of mercury by the mercurous iodide-silver iodide mixture in the visible region of the spectrum and the local catalytic thermal decomposition of materials such as mercurous oxalate and mercurous azide on this mercury.

Although the mercurous iodide-silver iodide mixtures alone are very light sensitive, printing out extremely rapidly on exposure to visible light, they are only slightly developed by heating and the entire photochemical response may be actually reversed by prolonged heating. This would indicate that the multiplication of the effect of light for three component materials of mercurous iodide, silver iodide, and a photothermographic substance such as mercurous oxalate or mercurous azide must be derived from the photothermographic substances present.

One example for preparing a photographic emulsion containing mercurous iodide, silver iodide and mercurous oxalate is as follows:

| | | |
|---|---|---|
| A. | Potassium oxalate monohydrate _____g__ | 52.0 |
| | Distilled water _____ml__ | 160 |
| B. | Mercurous nitrate _____g__ | 10.5 |
| | 6 N nitric acid _____ml__ | 6 |
| | Distilled water _____ml__ | 125 |
| C. | Silver nitrate _____g__ | 3.2 |
| | Distilled water _____ml__ | 150 |
| D. | Potassium iodide _____g__ | 4.0 |
| | Distilled water _____ml__ | 150 |
| E. | Gelatin _____g__ | 37.5 |
| | Distilled water _____ml__ | 150 |

The various materials are dissolved in distilled water in the amounts noted above. The procedures outlined below are carried under darkroom conditions using a red safelight.

Solution A is added very slowly and with rapid agitation to solution B. The resulting precipitate is stirred for two minutes and then washed by decantation with approximately three liters of distilled water.

Solution C is added within thirty seconds to rapidly agitated solution D. The resulting silver iodide precipitate is stirred for two minutes and then is added directly without washing to the mercurous oxalate-water mixture resulting from the reaction between solutions A and B. The excess iodide ion present with the precipitate of silver iodide reacts with the mercurous oxalate to form a third precipitate of mercurous iodide. The mixed precipitates are stirred for three minutes, washed by decantation and dispersed in solution E at 50° C.

The emulsion is then passed through a hand homogenizer and coated on slides formed of suitable clear plastic or glass. The slides are dried overnight and are then ready for use.

It is to be noted that the mercurous-iodide and silver iodide mixtures may vary from 1.0 to 90 mole percent of silver iodide. The best results, however, are obtained when the silver iodide is present in the mixture in 1.0 to 10 mole percent. The above mixtures are highly sensitive to light in the visible range up to approximately 500 to 550 millimicrons.

After the coated slide has been exposed, the latent image thereon may be thermally developed by placing the properly exposed plate on a heated block, emulsion side up, at a temperature of 105° C. for a period of four minutes.

The composition of the emulsion may be varied within wide limits. The silver iodide and mercurous iodide mixture may comprise a mole percent of silver iodide from 1 to 90.

Mixture F:                                    Mole percent
  Silver iodide (AgI) _____ 1 to 90
  Mercurous iodide ($Hg_2I_2$) _____ 99 to 10

The composition may be further varied by mixing with any combination of mixture F a mole percent of mercurous oxalate from 20 to 80. The best results, however, appear to be obtained when any combination of mixture F is added to an equi-molar quantity of mercurous oxalate.

Emulsions prepared in accordance with the teaching of the present invention gave an excellent image with an exposure of less than five seconds. Emulsions containing gelatin and mercurous oxalate when exposed under comparable conditions required an exposure of more than four minutes to produce a satisfactory negative.

Having thus described our invention what we claim as new and desire to secure by Letters Patent of the United States is:

1. A photographic element comprising a support and a gelatin layer having a photothermographic mixture dispersed therein, said mixture being composed of mercurous oxalate, silver iodide and mercurous iodide in a mole ratio such that the silver iodide is in the range of 0.01 to 0.90 mole fraction with respect to one mole of a mixture of silver iodide and mercurous iodide, and said mercurous oxalate constituting 20 to 80 mole percent of said photothermographic mixture.

2. A photographic element in accordance with claim 1 wherein said silver iodide is in the range of 0.01 to 0.10 mole fraction with respect to one mole of a mixture of silver iodide and mercurous iodide.

3. A photographic element in accordance with claim 1 wherein said mercurous oxalate constitutes 20 to 50 mole percent of said photothermographic mixture.

4. A photographic element comprising a support and a gelatin layer having a photothermographic mixture dispersed therein, said mixture being composed of mercurous oxalate, silver iodide and mercurous iodide in a mole ratio such that silver iodide is in the range of 0.01 to 0.10 mole fraction with respect to one mole of a mixture of silver iodide and mercurous iodide, and said mercurous oxalate constituting 20 to 50 mole percent of said photothermographic mixture.

References Cited in the file of this patent

UNITED STATES PATENTS

| | | |
|---|---|---|
| 2,700,610 | Suchow et al. | Jan. 25, 1955 |
| 2,728,664 | Carroll et al. | Dec. 27, 1955 |